Sept. 26, 1967   A. ZEITLIN ET AL   3,343,388
RAPID EXTRUSION DEVICES
Filed June 2, 1964   2 Sheets-Sheet 1

INVENTORS
ALEXANDER ZEITLIN &
JACOB BRAYMAN
BY Brumbaugh, Free, Graves &
Donohue
their ATTORNEYS Sept. 26, 1967     A. ZEITLIN ET AL     3,343,388
RAPID EXTRUSION DEVICES
Filed June 2, 1964     2 Sheets-Sheet 2
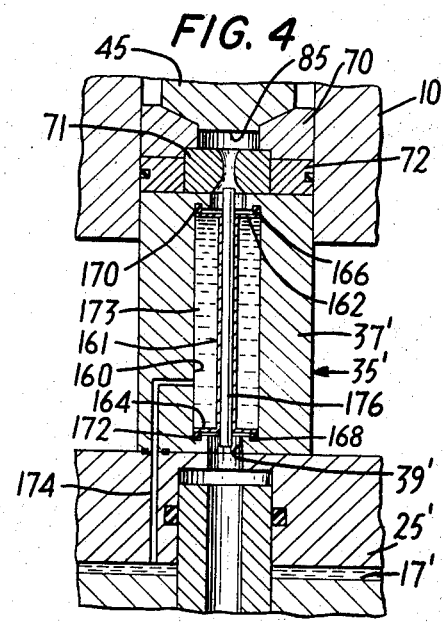
FIG. 4
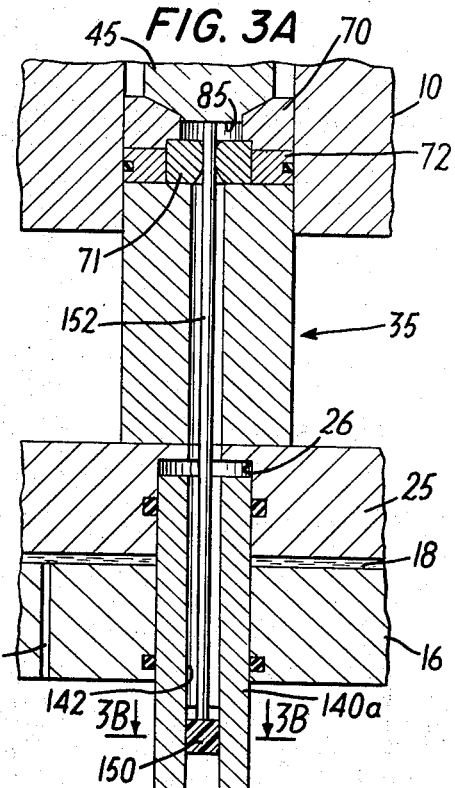
FIG. 3A
FIG. 3B
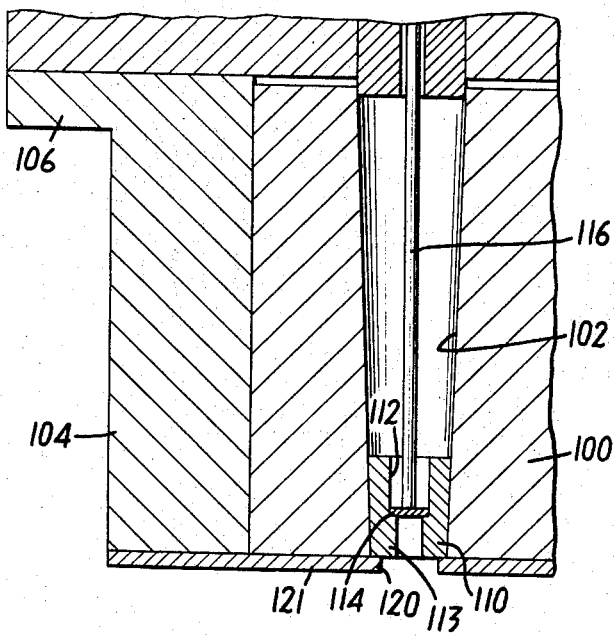
FIG. 2
INVENTORS
ALEXANDER ZEITLIN &
JACOB BRAYMAN
BY
their ATTORNEYS

United States Patent Office 3,343,388
Patented Sept. 26, 1967

3,343,388
RAPID EXTRUSION DEVICES
Alexander Zeitlin, White Plains, and Jacob Brayman, Staten Island, N.Y., assignors to Barogenics, Inc., a corporation of New York
Filed June 2, 1964, Ser. No. 372,066
9 Claims. (Cl. 72—56)

This invention relates to rapid extrusion apparatus and, more particularly, to novel and improved rapid extrusion apparatus having means for arresting and slowing down the extruded element as it comes from the die.

In rapid extrusion techniques, one problem encountered is to slow down the extrusion sufficiently to prevent it from being damaged and to enable it to be more conveniently handled. The problem is particularly acute in some relatively recently developed extrusion techniques such as, for example, high energy impact extrusion, hydrostatic extrusion and shock-aided hydraulic extrusion. In each of these techniques, very high energy is exerted on the billet to be extruded, and the energy required to initiate extrusion of the billet is significantly greater than the energy required once extrusion has commenced, first, because the static frictional resistance created by friction between the billet and the die is substantially greater than the dynamic frictional resistance, and second, because the internal frictional inertia of the billet resists the initiation of the extrusion. Accordingly, extruded elements produced by the above techniques initially merge from the die at extremely high velocity, but the elements emerge at a more moderate rate as soon as the energy required to overcome static friction between the billet and the die and the internal frictional inertia of the billet has ben expended. Therefore, in addition to difficulties encountered in handling the rapidly moving extruded element, the high velocity of the leading section of the element as compared to succeeding sections which have a lower velocity creates relatively large tensile stresses which result in "necking" or even fracture between the leading section and the remainder of the extruded element. Accordingly, it is important to be able to control the speed of the extruded element as it leaves the die.

For a more complete discussion and a graphical presentation of the variations in pressure and energy occurring during the extrusion of a billet by hydrostatic techniques, reference may be made to the copending application of Alexander Zeitlin Ser. No. 236,602, now Patent No. 3,181,328, granted May 4, 1965 for "Shock-Aided Extrusion" (assigned to the assignee of the present invention).

It has been previously suggested that the rate at which the element emerges can be controlled by extruding the billet into a vessel containing a liquid under a pressure sufficiently high to provide a desired retardation of the rate. For example, in hydrostatic extrusion, pressure in the receiving chamber is initially made equal to the pressure of the liquid in the billet chamber, and then the pressure in the receiving chamber is slowly reduced until the billet begins to extrude through the die. In flowing into the receiving chamber, the extruded element compresses the liquid, thereby raising its pressure and limiting the velocity at which it emerges from the die. A suitable valve or orifice is provided to control the flow rate of liquid from the receiving chamber to maintain the desired level of resistance to the extruding element.

This method, while satisfactory for extruding short, primarily experimental extrusions, is not well adapted for extrusions of a commercially suitable length, which may be, say, 40 feet or more in length. The receiving pressure chamber must, for extrusions of such lengths, be at least as long as the extrusions, and it is, at best, extremely difficult to design and construct a chamber of such a length which can safely sustain the required pressures, which may be as high as 200,000 p.s.i. or higher. Moreover, such chambers are obviously very expensive, both to build and to maintain. Moreover, means must be provided for opening the chamber to enable the extruded element to be removed, and additional floor space must be provided for permitting the extruded element to be withdrawn axially from the receiving chamber.

In accordance with the invention, high energy extrusion apparatus is provided which includes means for imparting high energy to a billet of material, die means through which the billet is urged by the energy to form an extrusion, and means for resisting the movement of an extruded element as it emerges from the die and during a predetermined length of linear travel thereof that is, until the rate of extrusion has reached a desired level, the frictional means including frictionally cooperating elements positioned adjacent and aligned with the path of the extrusion or an element selectively frictionally engageable with the extrusion itself. The frictional means may, in accordance with the invention, be arranged to provide a desired variable frictional force to arrest the movement of the extrusion, for example, by providing a member having a channel of varying dimension aligned with the path of the extrusion and receiving a plug, the plug or the member or both being compressible and providing a resisting force on the extrusion proportional to the degree of compression afforded by the relative dimensions of the plug and channel.

For a better understanding of the invention, reference may be made to the following description of exemplary embodiments, taken in conjunction with the figures of the accompanying drawings, in which:

FIG. 2 is a view in axial section on an enlarged scale of the arresting device illustrated in FIG. 1;

FIG. 3A is a view of another embodiment of an arresting device taken in axial section which is installed on a hydrostatic extrusion device, only a portion of which is illustrated;

FIG. 3B is a cross-sectional view taken on line 3b—3b of FIG. 3A; and

FIG. 4 is a view in axial section of a portion of the extrusion device of FIG. 1 having another embodiment of an arresting device utilized therein.

Figure 1:
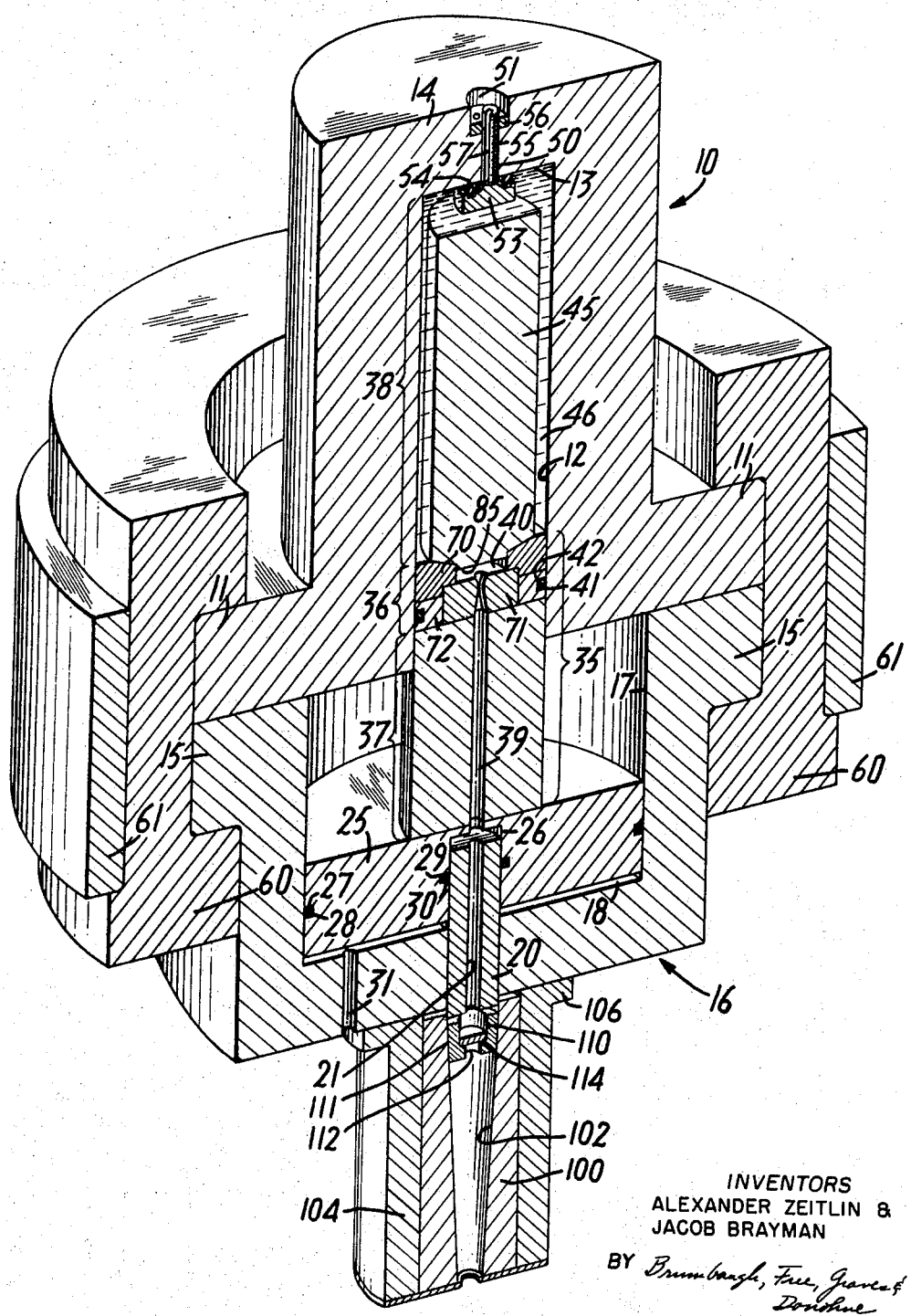
FIG. 1 is a pictorial view in axial section of a hydrostatic extrusion device having one embodiment of an arresting means installed thereon.

The hydrostatic extrusion device illustrated in FIG. 1 is substantially the same as that described in the patent to Gerard et al. for "Hydrostatic Extrusion System" U.S. No. 3,126,096 issued Mar. 24, 1964. While reference may be had to the printed patent for a full description for the hydrostatic device, it will be described briefly herein for convenience.

Referring to FIG. 1, a pressure containing vessel 10 has at its lower front end a flange 11 and is provided with an axial bore 12 opening at the lower end. The bore 12 extends upwardly only part way through the vessel 10 so that the top 13 of the bore is closed off by an end portion 14 of the vessel 10.

The flange 11 of vessel 10 registers with a flange 15 disposed at the upper end of and forming an integral part of a piston housing 16. Such housing contains hydraulic cylinder 17 co-axial with and of greater diameter than the bore 12. As shown, the cylinder 17 extends upwardly in housing 15 towards bore 12 from a cylinder bottom 18 formed by and end portion 19 of the housing 16 integral with the rest of the housing. An adapter tube 20 with a hollow axial core 21 extends upwardly through the end portion 19 to project into cylinder 17 beyond the bottom 18 thereof.

Received with sliding fit in cylinder 17 is an annular piston 25 having a central cylindrical hollow space 26 in which the adapter tube 20 is in turn received with a sliding fit. The piston 25 has formed in the exterior circumference thereof an annular groove 27 in which there is an O ring 28 providing a pressure seal between the piston and the wall of cylinder 17. In like manner, the piston 25 has formed in the interior circumference thereof an annular groove 29 in which there is an O ring 30 providing a pressure seal between the piston and the wall of tube 20. A conduit 31 passing through the bottom portion 19 of housing 16 permits injection of pressurized hydraulic fluid into cylinder 17 behind piston 25.

Mounted coaxially on piston 25 is a lesser diameter ram 25 comprised of a head 36 and a stem 37. The ram extends upwardly from the piston to have the front end of the ram received with the sliding fit in the open end of the bore 12 of vessel 10. The ram plugs such open end so that the ram forms together with the part of the bore inwards thereof a billet container chamber 38. Communicating with that chamber is a coaxial passageway 39 extending through the length of ram 35 from a lower juncture with space 26 inside piston 25 to an upper orifice 40 by which the passageway opens into the lower end of chamber 38. The chamber 38 is otherwise rendered pressure tight at its front end by an O ring 41 seated in an annular groove 42 formed in the head 36 of the ram, the ring 41 bearing against the circumferential wall of bore 12 to form a pressure seal.

Preferably, the ram merely rests on the piston so that it is free to find its natural position within bore 12 during an extrusion operation.

The chamber 38, as shown in FIGURE 1, containers (1) a lesser sized billet 45 having its lower end seated over orifice 40 in the head 36 of ram 35, and (2) a volume of a hydrostatic pressure transmitting medium 46 filling the interspace in chamber 38 between the billet and the wall surface of bore 12 which bounds chamber 38. Thus, the medium 46 entirely surrounds the billet except at its front end where the billet is seated on the ram. A fluid medium 46 may be introduced through the top of vessel 10 into chamber 38 by a simple valve system as follows. A cylindrical duct 50 of small diameter is formed in vessel 10 to pass upwardly from chamber 38 through the top portion 14 of the vessel into a larger diameter cylindrical well 51 formed in that top portion. Seated in the chamber 38 is a valve head 53 having an annular gasket 54 on its upper side. The hand 53 is connected to the bottom of a valve stem 55 which passes with a sliding fit upwardly through duct 50 to project into well 51 and to there engage threadedly with a nut 56 of greater diameter than duct 50. Formed in stem 55 is a keyway 57 extending lengthwise in that stem from a point just above head 53 to the top of the stem. Thus, the keyway 57 passes through the nut 56.

To inject fluid into chamber 38, the nut 56 is unscrewed to allow the stem 55 and attached head 53 to drop so as to open up a space between the gasket 54 and the top 13 of the chamber 38. Fluid is then poured into well 51 to pass from that well through keyway 57 into chamber 38. When the chamber has been filled with fluid, the nut 56 is retightened to draw the gasket 54 up against the top 13 of the chamber.

During an extrusion operation, the vessel 10 and the piston housing 16 are clamped together by a split ring clamp formed of two identical semi-circular halves 60, of which one appears in FIGURE 1. To ensure that the two halves of the clamp do not become separated, a safety ring 61 is placed around the clamp.

The head 36 of the ram 35 is, in fact, a die means for die assembly comprised of an upper annular primary die 70, a lower annular secondary die 71, and an annular die holder 72 disposed below die 70 and around die 71. To relate the presently described assembly to some of the previously described features of vessel 10, it is the central opening through primary die 70 which forms the orifice 40 by which the passageway 39 in ram 35 opens into the billet container chamber 38. Moreover, it is the die holder 72 which acts as the carrier for the previously described groove-and-ring pressure seal 41, 42 by which fluid is prevented from leaking out of chamber 38 through the circumferential interface between the die assembly and the cylindrical wall of bore 12. The elements 70–72 of the die assembly are fastened together and to the stem 37 of the ram 35 by conventional securing means (not shown) as, say, bolts. The secondary die 71 needs no particular securing means since such die is entirely constrained by the primary die 70, the die holder 72 and the ram stem 37. If desired, the die assembly need include only a single die instead of the two dies 70 and 71.

The bottom face of the billet 45 and the top face of the primary die 70 are matched in contour to make flat contact with each other over an annular area disposed radially outward of the orifice 40. This annular area of contact forms a seal which prevents hydraulic fluid 46 in the interspace around the billet from leaking underneath the billet into orifice 40 and thence out passageway 39. As shown, the billet 45 has formed at the front end thereof a cylindrical stub 85 which projects into the orifice 40. This stub serves both to center the billet in relation to the die assembly in the source of setting up the apparatus and to provide a leader into the die during the extrusion process.

The hydrostatic extrusion apparatus is set up for cold extrusion in the following manner. With the safety ring 61, the split ring clamp 56 and the vessel 10 being at the bottom of the hydraulic cylinder 17, and with the ram 35 upstanding from the piston as shown, a billet 45 of material to be extruded is seated in centered relation on the ram 35. The vessel 10 is then placed over the housing 15 so that the flange 11 of the vessel and the flange 15 of the housing are in registration, and so that the ram and the billet thereon slip into he bore 12 of the vessel. Next, the ring clamp is assembled to lock together the flanges 11, 15 and the safety ring 61 is placed around the assembled ring clamp. Finally, the chamber 38 within the bore 12 is filled with hydrostatic fluid in the manner heretofore described through the valve system at the top of the vessel. The apparatus is now ready to operate.

The extrusion operation is initiated by injecting hydraulic fluid through conduit 31 into cylinder 17 behind piston 25 so as to drive the piston upwardly into the bore 12, the ram compacting the fluid 46 to build up the hydrostatic pressure therein to the critical value required to initiate extrusion of billet material through the die assembly 36.

The critical hydrostatic pressure value is reached when the pressure exerted on the billet by the fluid 46 is high enough to render the billet material sufficiently plastic to start to flow into the die assembly and thereafter, through, in order, the rest of passageway 39, the space 26 inside piston 25 and the hollow core 21 of adapter tube 20 to be finally ejected from the apparatus, to overcome internal inertial forces in the billet, and to overcome the static frictional forces between the billet and the die member 70. Once this critical pressure has been reached, the extrusion of the billet material begins, the further advancement of the ram 35 into bore 12 maintaining a pressure in fluid 46 sufficient to continue the extrusion of the billet material until all of the billet has been extruded. The pressure required to initiate the extrusion of the billet through the die is substantially greater than that required to continue extrusion once it has begun. Thus, the initial section of the extrusion emerges from the die at an extremely high velocity, inasmuch as the energy required to initiate extrusion is suddenly released when the extrusion emerges. Thereafter, the rate of extrusion is slower, and the velocity of the remainder of the extrusion is considerably lower. The inertia of the initial segment creates high tensile stress which tends to cause "necking down" or fracture of the initial section. Accordingly, it is desirable to retard the speed of the initial section, in other words, to absorb at least part of the excess energy of the extrusion as it emerges from the die means, and preferably, that portion of the energy required to overcome static frictional forces between the die and the billet and the internal frictional inertia of the billet.

In the embodiment illustrated in FIGS. 1 and 2, the arresting means includes a cylindrical member 100 having a tapered channel 102 formed therein, the channel in this embodiment tapering in the same direction as the movement of the extrusion. The member 100 is mounted in a supporting sleeve 104, and the channel 102 is axially aligned with the path of the extrusion, that is, with the passageway 39 and the hollow core 21. The sleeve 104 may be provided with an upper flange 106 for facilitating attachment thereof to the piston housing 16, such as by bolts or the like.

Slidably disposed within the tapered channel 102 is a plug 110 having a similarly tapered outer wall 111. Either the plug 110 or the member 100, or both, are preferably made of a resiliently compressible material, for example, Teflon, nylon, or various other plastics. The plug is provided with an axial bore 112 which is of somewhat larger size than the extrusion (not shown). Positioned within the bore, for example, supported on an inwardly extending flange 113 on the lower end of the plug 110, is a blocking piece 114. Supported on the disc 110 and extending upwardly through the hollow core 21 of the adaptor 20 and through the passageway 39, and terminating just below the die element 71, is a rod 116. In an extrusion operation the rod is engaged by the extruded element as it emerges from the die and imparts the energy of the extruded element directly to the blocking piece 114, or, putting it another way, transmits the arresting effect of the arresting device directly to the extrusion as soon as it emerges from the die.

As the extrusion leaves the billet chamber 12, its leading end contacts the rod and forces it downwardly, thereby moving the plug 110 downwardly in the channel 102. Frictional forces developed at the interface between the plug 110 and the channel 102 resist the movement of the extrusion and slow it down. By a suitable selection of materials for the plug 110 and the member 100, of the length of the member 100 and of the angle of the conical paper of the channel 102, frictional forces retarding the rate of the extrusion of the billet can be established to dissipate the excess energy released upon the initiation of extrusion. The channel 102 need not have a conical taper but may have any configuration which will vary the forces resisting the extrusion according to any desired relationship to the distance through which the extrusion has moved.

When the extrusions are moderately short, the arresting device of FIGS. 1 and 2 may be made full length in which case, after a constriction providing a predetermined degree of resistance has been reached, preferably the point when the excessive energy required to initiate extrusion, has been dissipated, the channel 102 may be enlarged and provide only a moderate degree of resistance, or perhaps no resistance at all, to the extrusion of the billet.

For extrusions of considerable length, however, it is desirable to limit the length of the arresting device to only an initial portion of the movement of the extrusion. Accordingly, the arresting device illustrated in FIGS. 1 and 2 is arranged so that the resistance to movement of the extrusion is terminated after it has reached a desired point. This is accomplished by designing the blocking piece 114 so that it will provide the necessary strength to support the forces resisting the movement of the extrusion until the desired amount of energy has been dissipated, and then will fracture, preferably by shearing along the perimeter of the rod, when an additional force is introduced. This additional force is provided by a shoulder 120 extending into the channel 102, for example, the shoulder provided by ring 121 secured to the sleeve 104. Upon encountering the shoulder 120, the plug 110 is stopped and the force with which the plug 110 resists movement of the rod 116 is accordingly increased. The increase in force reacts through the ring on the rod 116, and the force on rod, which continues to be driven downwardly by hydrostatic pressure on the billet imparted to the extrusion, builds up until the blocking piece 114 is no longer able to sustain the force. The blocking piece will then shear away and permit the rod and the extrusion to move unimpeded thereafter.

FIGS. 3A and 3B illustrate another embodiment of an arresting device for rapid extrusion apparatus. In this embodiment, a member 140 is mounted below the ram chamber 16 or, as illustrated, substituted for the adapter tube 20, one end extending into the chamber 16 and the piston 25. The upper part 140a of the member 140 is generally cylindrical and has a bore 142. The lower portion 140b of the member 140 is formed with a tapered slot 144 dividing it into laterally opposed portions 146 and 148 as best shown in FIG. 3B. A plug 150 made of an elastically compressible material is slidably installed in the slotted lower portion 140b of the member 140 and a rod 152 extends upwardly through the core 21 and passage 39 to just below the die 71.

When the extrusion emerges through the die 71, it contacts the upper end of the rod 152 and forces the rod and the plug 150 downwardly. The frictional forces at the interface between the plug 150 and the slot 144 retard the movement of the extrusion, the force gradually decreasing beacuse of the taper of the slot as the energy of the extrusion is dissipated. Thus, the embodiment of FIGS. 3A and 3B provides a substantially uniform resistance to the extrusion for a predetermined period of time. When a relatively uniform velocity of extrusion has been obtained, the plug 150 leaves the end of member 140, thereby eliminating the frictional forces resisting the extrusion. As in the arresting device of FIGS. 1 and 2, the embodiment of FIGS. 3A and 3B, by the proper selection of the materials and surface treatments for the member 140 and the plug 150 and by a suitable tapering or other configuration for the slot 144 through which the plug 150 moves, a desired resistance to the initial section of the extrusion may readily be obtained.

An advantage of the embodiment of FIGS. 3A and 3B is that the plug 150 projects laterally beyond opposite sides of the member 140. Inasmuch as the plug must be replaced in the slot 144 before each operation, the projecting portions are adapted to be engaged by a yoke device coupled to, for example, a hydraulic piston which will slide the plug through the slot to a ready position for the extrusion operation.

Referring now to FIG. 4, which illustrates a further embodiment of the invention, the stem 37' of the ram 35' is provided with an enlarged chamber 160 coaxial with the passageway 39'. Disposed within this chamber is a sleeve 161 having upper and lower flanges 162 and 164, respectively, which extend outwardly to adjacent the outer wall of the chamber 160. Longitudinally outwardly of the sleeve flanges 162 and 164 and installed in grooves 166 and 168 in the ram stem 37' are O-ring seals 170 and 172 which seal off the chamber 160 and define in the ram stem 37' an annular vessel 173. The vessel 173 is communicated through the ram stem 37' and the piston 25' to the head of the cylinder 17' by an orifice 174. Under normal pressure conditions in the cylinder 17', the dimensions of the interior of the sleeve 161 are somewhat larger than the dimensions of the extrusion so that the extrusion may pass freely therethrough. However, for higher pressures, particularly pressures above the pressure required to sustain extrusion once it has been initiated, the sleeve 161 is compressed or collapsed inwardly into frictional engagement with the extrusion. A member 176 having a shape corresponding in cross-section to that of the extrusion is positioned within the sleeve when the extrusion operation is commenced, and is contacted and forced through the sleeve 161 by the leading end of the extrusion. The frictional forces developed resist the extrusion and maintain its initial rate of movement at a desired level.

To enable the desired frictional forces to be developed, the sleeve 161 has a wall thickness and is made of a material which enables it to be elastically compressed inwardly so as to contact the walls of the extruded element with a predetermined force. Of course, the interior of the sleeve 161 is suitably shaped in cross-section to provide pressure against the extrusion at desired points at its perimeter such points usually constituting only a portion of the surface of the extrusion.

At the higher pressures required to initiate extrusion, the maximum resistance to the passage of the extruded element through the interior bore of the sleeve 161 is present. As extrusion continues, the pressure in the piston cylinder 17' falls gradually until it reaches a relatively uniform level, and from that time on extrusion takes place at a normal rate. A corresponding gradual pressure reduction takes place in the chamber around the sleeve 161, and accordingly, the sleeve resiliently expands outwardly thereby gradually reducing the frictional resistance to the extrusion of the extruded element. By the time normal pressure required for extrusion has been established, the interior bore of the sleeve 161 is removed from significant frictional contact with the extrusion, and it passes freely therethrough.

In addition to disposing a sleeve in the chamber formed within the bore, such an arrangement being preferred inasmuch as the extrusions of the extruded element is retarded almost immediately upon passing from the die, a similar pressure vessel and sleeve arrangement may be provided exteriorly of the ram chamber in a manner similar to the other embodiments described above. In such a case, a rod may be utilized between the lower exit portion of the die and the upper end of the sleeve. The distance between the pressure vessel and sleeve arrangement and the lower end of the die may be adjusted in order to provide the desired length of resistance and dissipation of energy. By locating such a pressure vessel and sleeve arrangement exteriorly of the extrusion device, and providing a sleeve having a size greater than the largest dimension of the extrusion, it is possible to extrude various shapes and provide a cylindrical bore in the sleeve.

The embodiments of the invention described above are meant to be merely exemplary, and those skilled in the art will be able to make many modifications and variations therein. Such modifications and variations are intended to be within the scope of the invention as defined in the appended claims.

We claim:

1. In a rapid extrusion device having means for imparting high energy to a billet of material and die means through which the billet is urged by the energy to form an extrusion, the improvement in combination therewith of a member having a channel aligned with the path of the extrusion, and a plug disposed in said channel and movable therein, at least one of said member and said plug being compressible and cooperating with the other to provide a predetermined frictional force resisting movement of the extrusion through said channel.

2. An improvement in a rapid extrusion device as set forth in claim 1, wherein said channel is tapered in the same direction as that in which the billet is extruded, and said plug includes a bore having a blocking piece therein, said blocking piece resisting the movement of the extrusion during the predetermined length of movement of said plug through said channel and rupturable by the extrusion at the end of said predetermined length of movement to facilitate free movement of said extrusion.

3. An improvement in a rapid extrusion device as set forth in claim 1, wherein said channel is tapered in a direction counter to that in which the billet is extruded, whereby the force resisting the extrusion is gradually reduced.

4. In a rapid extrusion device having means for imparting high energy to a billet of material and die means through which the billet is urged by the energy to form an extrusion, the improvement in combination therewith, comprising means defining a chamber aligned with the path of the extrusion, a sleeve of elastically deformable material defining an inner wall of said chamber, means for communicating a predetermined hydrostatic pressure to said chamber, the interior walls of said sleeve aligned with the path of the extrusion emerging from the die means and said sleeve compressible by the hydrostatic pressure in said chamber into frictional engagement of its interior walls with elements moving therethrough to resist the movement of the extrusion and elastically movable upon reduction of the hydrostatic pressure in said chamber out of engagement with said elements.

5. The improvement in a hydrostatic extrusion device as set forth in claim 4, wherein the elements selectively engaged by the sleeve comprises a rod member disposed therein and the extrusion, said rod member engageable by the leading end of the extrusion and pushed through by said sleeve thereby, and the extrusion following said rod member through said sleeve.

6. In a rapid extrusion device having means for imparting high energy to a billet of material and die means through which the billet is urged by the energy to form an extrusion, the improvement in combination therewith of an elongated member having a longitudinally extending opening aligned with the path of the extrusion, and a plug disposed in said opening and movable therein, at least one of said members and said plug being compressible and cooperating with the other to provide a predetermined frictional force resisting movement of the extrusion through said opening.

7. An improvement in a rapid extrusion device as set forth in claim 6, wherein said opening comprises a tapered slot.

8. An improvement in a rapid extrusion device as set forth in claim 6, wherein said opening comprises a channel.

9. In a rapid extrusion device having means for imparting high energy to a billet of material and die means through which the billet is urged by the energy to form an extrusion, the improvement in combination therewith comprising: resisting means for frictionally resisting the movement of the extrusion as it emerges from the die means and during a predetermined length of linear travel thereof, said resisting means including; a first member having at least one surface extending generally in the direction of the path of the extrusion, a second member having first and second portions, said first portion engageable with said extrusion as it emerges from the die means for movement therewith and said second portion frictionally engaging said surface of said first member.

References Cited

UNITED STATES PATENTS

| | | | |
|---|---|---|---|
| 947,162 | 1/1910 | Schaller | 72—253 |
| 2,142,703 | 1/1939 | Sparks | 72—271 |
| 2,865,502 | 12/1958 | Anscher | 72—257 |
| 3,107,006 | 10/1963 | Myotte | 72—291 |

RICHARD J. HERBST, *Primary Examiner.*

H. D. HOINKES, *Assistant Examiner.*